US012557175B2

(12) United States Patent
Dass et al.

(10) Patent No.: US 12,557,175 B2
(45) Date of Patent: Feb. 17, 2026

(54) TRANSMISSION OF GRANT REQUESTS FOR DISCONTINUOUS RECEPTION (DRX) CYCLES

(71) Applicant: QUALCOMM Incorporated, San Diego, CA (US)

(72) Inventors: Shweta Jaikrishna Dass, San Diego, CA (US); Krishna Chaitanya Bellam, Telangana (IN); Shailesh Maheshwari, San Diego, CA (US); Vishal Dalmiya, San Diego, CA (US); Gang Andy Xiao, San Diego, CA (US); Vaishakh Rao, San Diego, CA (US); Sathish Kumar Nallamanti, Telangana (IN); Leena Zacharias, San Jose, CA (US); Touseef Khan, San Diego, CA (US); Sridhar Ramanujam, San Diego, CA (US); Nan Zhang, Beijing (CN); Xiaojian Long, San Diego, CA (US); Ajeet Kumar, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 373 days.

(21) Appl. No.: 18/261,666

(22) PCT Filed: Mar. 10, 2021

(86) PCT No.: PCT/CN2021/079983
§ 371 (c)(1),
(2) Date: Jul. 14, 2023

(87) PCT Pub. No.: WO2022/188062
PCT Pub. Date: Sep. 15, 2022

(65) Prior Publication Data
US 2024/0147572 A1  May 2, 2024

(51) Int. Cl.
*H04W 76/28* (2018.01)
*H04W 52/02* (2009.01)

(52) U.S. Cl.
CPC ....... *H04W 76/28* (2018.02); *H04W 52/0216* (2013.01)

(58) Field of Classification Search
CPC . H04W 76/28; H04W 52/0216; H04W 72/21; H04W 24/08; H04W 52/0248; H04W 72/231; Y02D 30/70
See application file for complete search history.

(56) References Cited

U.S. PATENT DOCUMENTS

| 2016/0286603 A1 | 9/2016 | Vajapeyam et al. |
| 2019/0174388 A1 | 6/2019 | Cai et al. |
| 2021/0029635 A1 | 1/2021 | Meylan et al. |

FOREIGN PATENT DOCUMENTS

| CN | 102076067 A * | 5/2011 | ........ H04W 52/0216 |
| CN | 108377551 A | 8/2018 | |
| WO | 2020199218 A1 | 10/2020 | |

OTHER PUBLICATIONS

International Search Report and Written Opinion—PCT/CN2021/079983—ISA/EPO—Dec. 8, 2021.

(Continued)

*Primary Examiner* — Ayanah S George
(74) *Attorney, Agent, or Firm* — ArentFox Schiff, LLP

(57) ABSTRACT

In an aspect of the disclosure, a method, a computer-readable medium, and an apparatus are provided. The apparatus may be a user equipment (UE) or component thereof. The apparatus may be configured to transmit to a base station a first request to transmit data in a buffer. The apparatus may be further configured to transmit to the base station a second request to transmit the data in the buffer in absence of a grant in response to the first transmit request. The apparatus may be further configured to remain awake (Continued)

for at least a portion of a scheduled discontinuous reception (DRX) sleep state following the transmission of the second request.

26 Claims, 8 Drawing Sheets

(56) References Cited

OTHER PUBLICATIONS

Nokia, et al., "On UE Adaptation to the Traffic", 3GPP Draft, R1-1901188, 3GPP TSG RAN WG1 Ad-Hoc #1901, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21-Jan. 25, 2018, Jan. 20, 2019 (Jan. 20, 2019), XP051594031, 13 pages, section 2.2; p. 4-p. 6, the whole document.
OPPO: "Details of SR Procedure", 3GPP TSG RAN WG2 #99-Bis, R2-1710128 revision of R2-1707736, Details of Sr Procedure, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Oct. 9-Oct. 13, 2017, Oct. 8, 2017, pp. 1-4, XP051342196, p. 1, line 23-line 26.
Supplementary European Search Report—EP21929541—Search Authority—The Hague—Nov. 14, 2024.

* cited by examiner

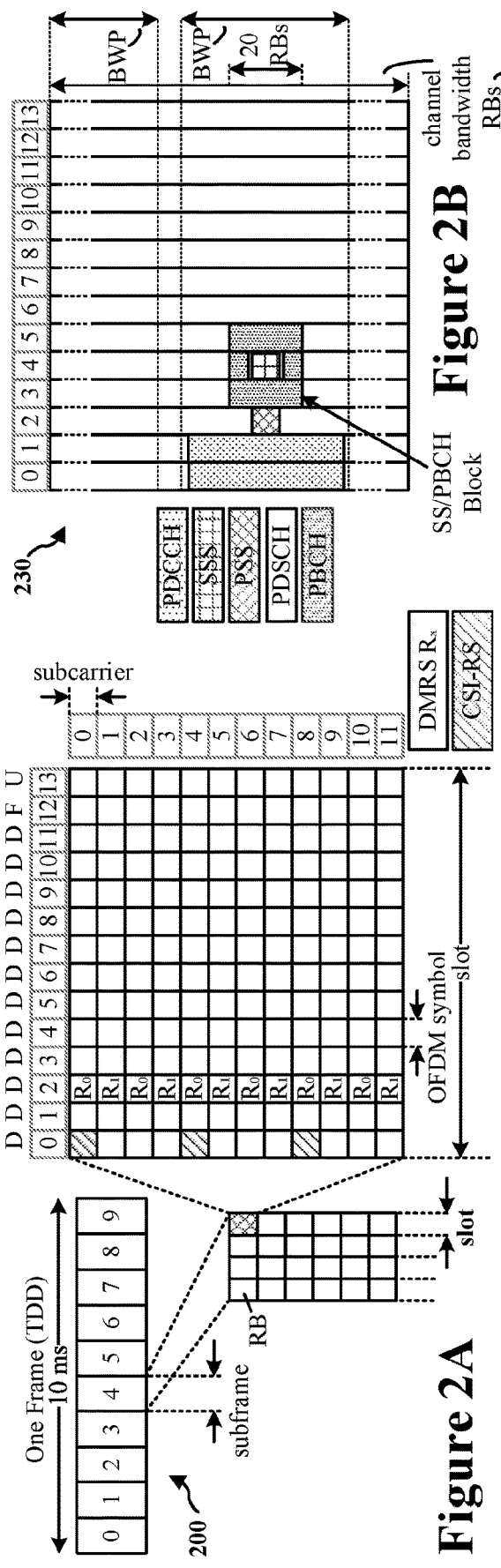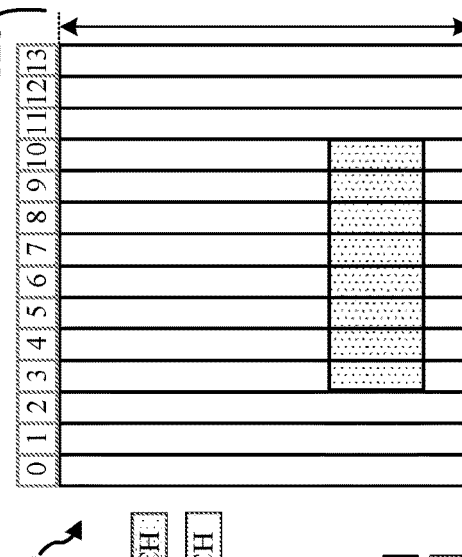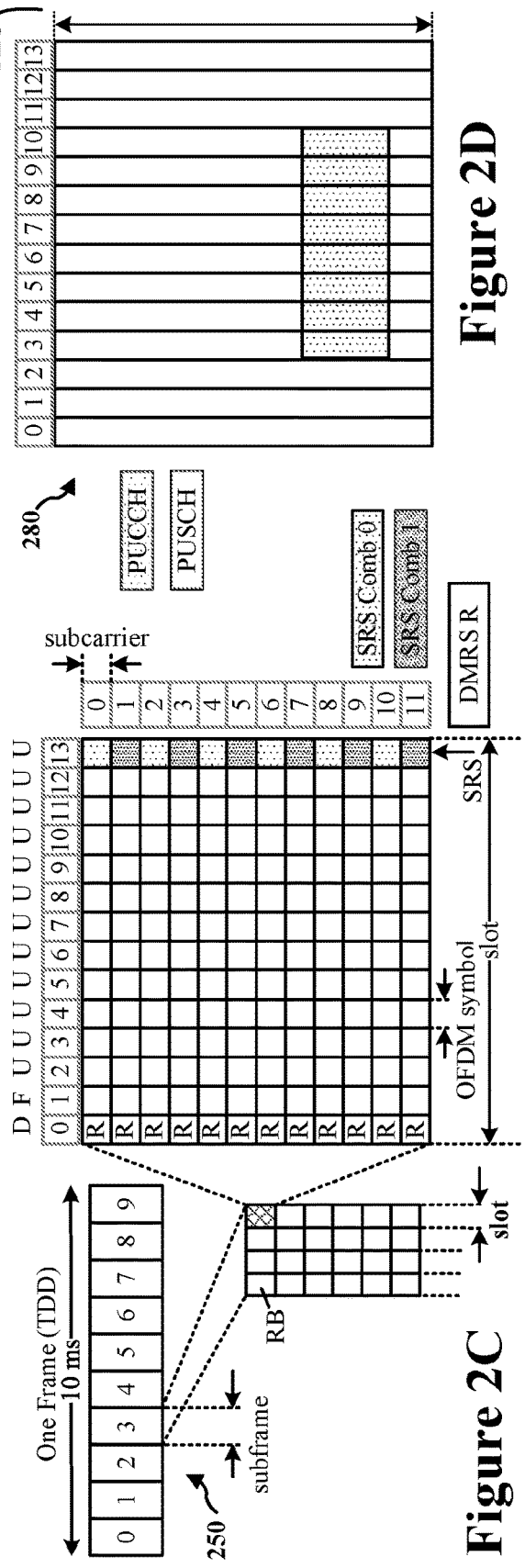
Figure 2A  Figure 2B  Figure 2C  Figure 2D

TRANSMISSION OF GRANT REQUESTS FOR DISCONTINUOUS RECEPTION (DRX) CYCLES

CROSS REFERENCE TO RELATED APPLICATION(S)

This application is a National Phase entry of PCT Application No. PCT/CN2021/079983, entitled "TRANSMISSION OF GRANT REQUESTS FOR DISCONTINUOUS RECEPTION (DRX) CYCLES" and filed on Mar. 10, 2021, which is expressly incorporated by reference herein in its entirety.

BACKGROUND

Technical Field

The present disclosure generally relates to communication systems, and more particularly, to a user equipment (UE) configured to obtain grants from a base station for transmission of the data to the base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) or component thereof. The apparatus may be configured to transmit to a base station a first request to transmit data in a buffer. The apparatus may be further configured to transmit to the base station a second request to transmit the data in the buffer in absence of a grant in response to the first transmit request. The apparatus may be further configured to remain awake for at least a portion of a scheduled discontinuous reception (DRX) sleep state following the transmission of the second request.

In another aspect of the disclosure, another method, another computer-readable medium, and another apparatus are provided. The other apparatus may be a base station or component thereof. The other apparatus may be configured to receive a message from a UE indicating that the UE is remaining awake for at least a portion of a scheduled DRX sleep state. The other apparatus may be further configured to transmit to the UE a grant to transmit data in response to a transmit request when the UE remains awake for at least a portion of the scheduled DRX sleep state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
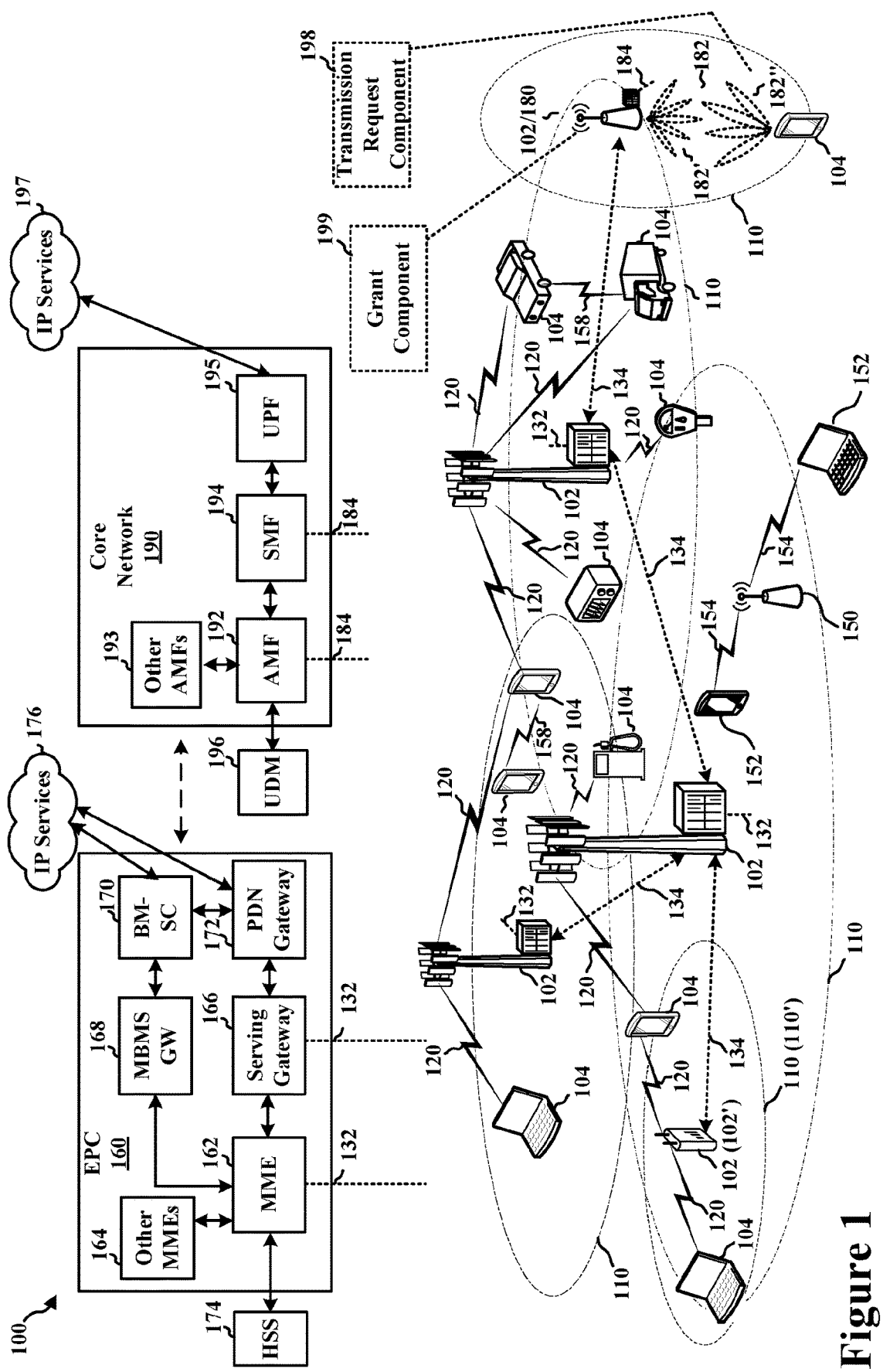
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

In various access networks, a user equipment (UE) may transmit data to a network (e.g., including a base station) according to allocated resources granted by the network. For example, the UE may transmit, to the network, a request to transmit, such as when one or more transmission buffers of the UE include data. Examples of a request to transmit include a scheduling request (SR) and a buffer status report (BSR). In some aspects, the UE 504 may transmit a request, such as an SR or BSR, when data arrives at lower layer of the UE 504 for transmission to the network. For example, data to be transmitted to a base station may arrive at a Layer 1 (L1) of the UE, such as a physical (PHY) layer, or data may arrive at a Layer 2 (L2) of the UE, such as a media access control (MAC) layer. Data to be transmitted to the network may be held in at least one transmission buffer while the UE obtains a base station or network grant indicating allocated resources for transmission of the data.

A network (e.g., including a base station) may respond to a request to transmit by transmitting a grant, which may inform the requesting UE of resources allocated to transmission of some or all of the data buffered by the UE. In some instances, however, a grant responsive to a transmission request from a UE may be absent, such as where a UE does not receive a grant from the network in response to a transmission request within a certain time period or where the UE fails to decode a grant from the network. In one example, UEs in some networks may experience scenarios in which base stations cease transmitting grants to the UEs for some duration. In another example, UEs in some environments may be unable to decode grants, such as UEs in environments in which the channels are noisy. A noise on a channel, which may be detected by measuring a signal-to-noise ratio (SNR), reference signal receive power (RSRP), or other similar mefric for channel quality, may prevent a UE from successfully decoding a grant or may cause a UE to entirely miss a grant.

Absent a grant, a UE may lack allocated resources on which the UE can transmit data in the transmission buffers. However, data may continue to accumulate in the buffers of the UE, as relatively newer data arrives and is buffered with relatively older data still awaiting transmission. Potentially, such accumulation of data in transmission buffers of the UE may hamper UE performance.

Thus, the absence of a grant responsive to a transmission request from a UE may negatively affect the performance of the UE. For example, as data continues to accumulate in transmission buffers of the UE, the UE may experience an increase in latency, an increase in computational load, and may reduce overall performance by the UE. Illustratively, the accumulation of data in buffers of the UE may consume memory while also causing at least some data to become stale.

Stale data may be of particular importance now, with the popularity of streaming video, video calls, gaming, and so forth continuing to grow. At least some of the aforementioned categories include various applications available for a UE, though many consume a relatively large amount of resources relative to other applications. Many of the foregoing applications may generate a significant percentage of the traffic that a UE sends over the air. However, such traffic is often bursty and unpredictable, while also being relatively delay intolerant so that buffered data quickly becomes stale.

In view of the foregoing, UE performance may benefit from one or more mechanisms that prevent or avoid absence of a transmission grant when a UE transmits a request to transmit to a base station.

The present disclosure provides various techniques and solutions to the absence of a grant at a UE. Various aspects are described herein that may reduce the latency experienced by the UE in transmitting buffered data in absence of a grant responsive to a request to transmit the buffered data.

Accordingly, aspects of the present disclosure may serve to increase the rate at which a UE is able to transmit buffered data, as well as reduce the frequency and severity of data accumulation in the buffers. In so doing, various aspects described herein may reduce latency, computational load, and/or other overhead on a UE, and may increase UE performance.

FIG. 1 is a diagram illustrating an example of a wireless communications system and an access network 100. The wireless communications system (also referred to as a wireless wide area network (WWAN)) includes base stations 102, UE 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a transmission request component 198. The transmission request component 198 may be configured to generate a transmission request that the UE 104 may transmit to the base station 102/180. The transmission request component 198 may generate the transmission request based on pending data that is being stored in one or more transmission buffers, and the transmission request may indicate a request for resources to be allocated on which the UE 104 may transmit the pending data to the base station 102/108.

The transmission request component 198 may transmit the first transmission request to the base station 102/180, and a grant may be expected in response. In some aspects, however, the UE 104 may determine that a grant is (or is likely) absent, such as when the UE 104 determines that the channel carrying the grant is noisy, when the UE 104 fails to successfully decode a grant, when a retransmission timer expires, and so forth.

The transmission request component 198 may be further configured to generate a second transmission request to transmit data in the buffer in absence of a grant responsive to the first transmission request. The transmission request component 198 may transmit the second transmission request to the base station 102/180 in absence of the grant responsive to the first transmission request. The transmission request component 198 may be further configured to remain awake for at least a portion of a scheduled discontinuous reception (DRX) sleep state following the transmission of the second transmission request.

Potentially then, the UE 104 may receive a grant (e.g., responsive to the second transmission request) at an earlier time than if the UE 104 were to enter the scheduled DRX sleep state. Further, the UE 104 may reduce the duration and/or frequency with which the UE 104 is not provided a grant indicating resources allocated for transmission of buffered data by the UE 104.

In some aspects, for example, following transmission of the second request, the UE 104 may remain awake for at least a portion of a scheduled DRX sleep state, and the transmission request component 198 may monitor quality of the wireless channel (on which the grant is expected to be carried) with the base station 102/180 for a grant during the scheduled DRX sleep state. In some other aspects, the transmission request component 198 may generate a message requesting to shorten the scheduled DRX sleep state. The transmission request component 198 may transmit the message to the base station 102/180, and in some aspects, the transmission request component 198 may receive a response from the base station 102/180 to the message requesting to shorten the scheduled DRX sleep state. The response may shorten the DRX sleep state so that the UE 104 remains in an awake state for a longer period of time, and so may be more likely to receive a grant that may have been delayed.

Correspondingly, a grant component 199 of the base station 102/180 may be configured to receive a message from the UE 104 indicating the UE is to remain awake for at least a portion of a scheduled DRX sleep state. In some aspects, the message may include an indication that the UE 104 is remaining awake during the entire scheduled sleep state. In some other aspects, the message may include a request by the UE 104 to shorten the scheduled DRX sleep state. In some aspects, the base station 102/180 may be configured to transmit a response to the message, which may shorten the duration of the DRX sleep state for the UE 104. The base station 102/180 may be further configured to transmit, to the UE 104, a grant to transmit data when the UE remains awake during at least a portion of the scheduled DRX sleep state.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where I is the numerology 0 to 4. As such, the numerology $p=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology=2 with 4 slots per subframe. The slot duration is 0.25 ms, the subcarrier spacing is 60 kHz, and the symbol duration is approximately 16.67 microseconds (s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as R, for one particular configuration, where 100× is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a BSR, a power headroom report (PHR), and/or UCI.

Figure 3:
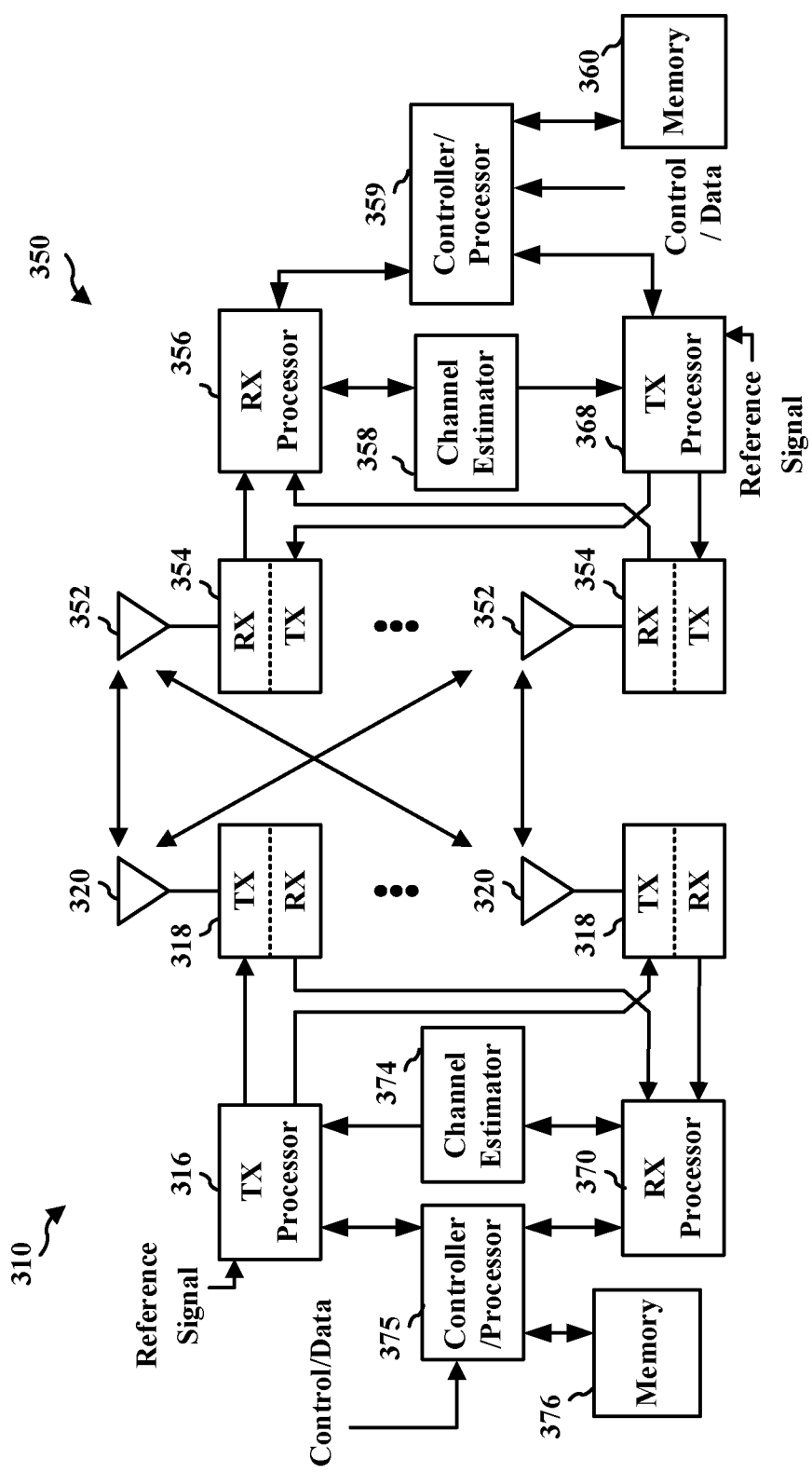
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 3 and Layer 2 functionality. Layer 3 includes a radio resource control (RRC) Layer, and Layer 2 includes a service data adaptation protocol (SDAP) layer, a packet data convergence protocol (PDCP) layer, a radio link control (RLC) layer, and a MAC layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement Layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements Layer 3 and Layer 2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the transmission request component 198 of FIG. 1.

In some other aspects, at least one of the TX processor 316, the RX processor 370, and the controller/processor 375 may be configured to perform aspects in connection with the grant component 199 of FIG. 1.

Figure 4:
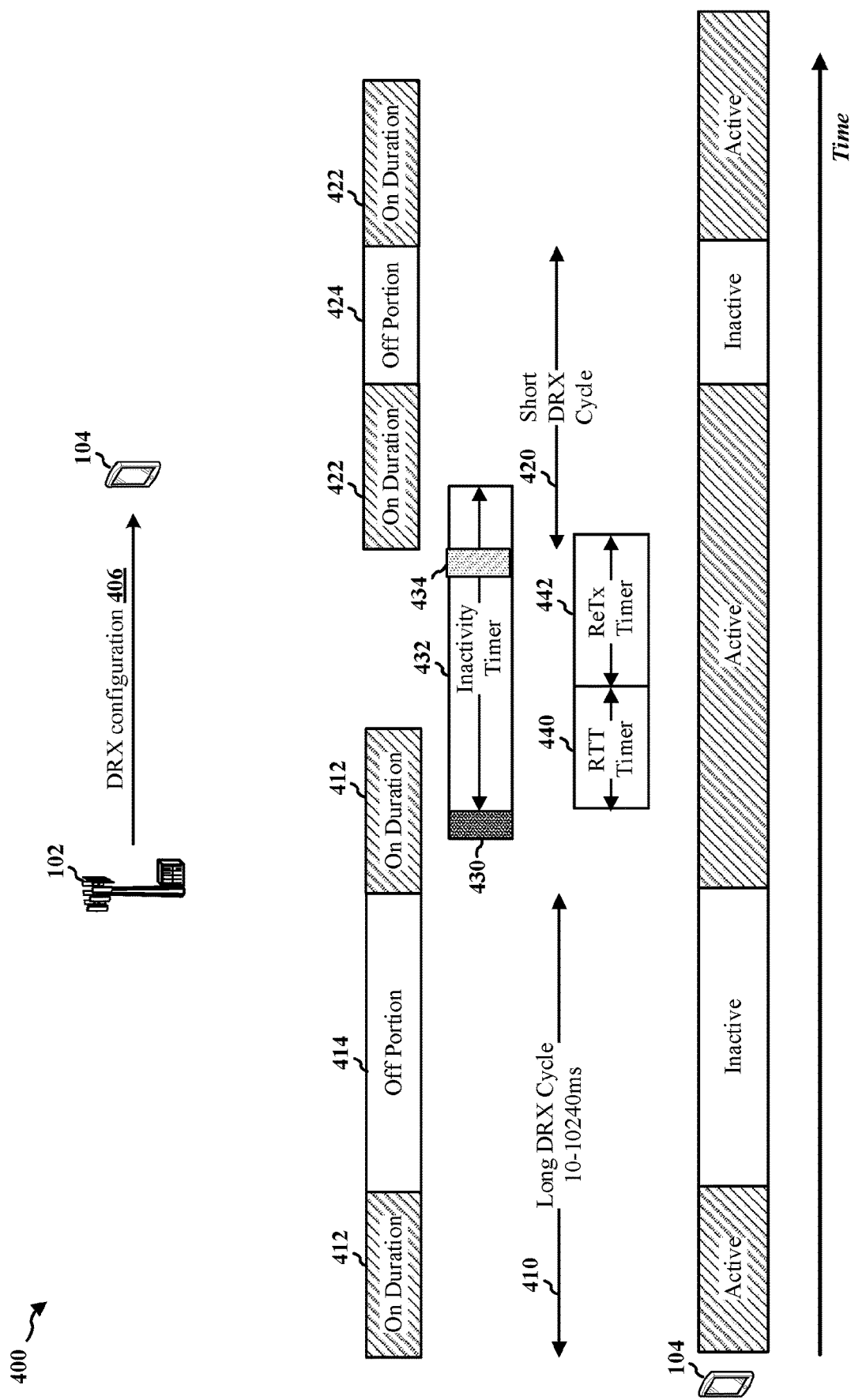
FIG. 4 is a diagram illustrating an example of a UE that operates with discontinuous reception (DRX) according to a configuration by the base station.

FIG. 4 is a diagram 400 illustrating an example of DRX operation for a Uu link between a base station 102 and a UE 104. In some aspects, the base station 102 may configure at least one DRX cycle for the UE 104. Accordingly, the base station 102 may transmit a DRX configuration 406, which may indicate the at least one DRX cycle to the UE 104. For example, the base station 102 may transmit information configuring various parameters or other values that the UE 104 may use to adhere to the DRX cycle configured by the base station 102. Specifically, the DRX configuration 406 may indicate at least one of an inactivity timer 432, a round trip time (RTT) timer 440, a retransmission timer 442, a long DRX cycle 410, a short DRX cycle 420, and/or other such information.

The UE 104 may be configured with at least one of a long DRX cycle 410 and a short DRX cycle 420. For example, the long DRX cycle 410 may be 10-10240 ms. The long DRX cycle 410 may include an on duration 412 during which the UE 104 monitors a PDCCH for grants and an off portion 414 during which the UE 104 may not monitor the PDCCH for grants (e.g., where the UE 104 may reduce or power off some circuitry).

When the UE 104 is configured to operate with at least one of the DRX cycles 410, 420, and the UE 104 is connected with the base station 102, the UE 104 may be operating with connected mode DRX (C-DRX). For example, when the UE 104 is in an RRC Connected mode with the base station 102, as when the UE 104 monitors the PDCCH for grants from the base station 102, the UE 104 may be operating in C-DRX.

When the UE 104 receives a grant for a new transmission (e.g., grant 430), the UE 104 may start an inactivity timer 432. The inactivity timer 432 may be reset whenever a grant for a new transmission is received and the UE 104 may monitor the PDCCH for grants while the inactivity timer 432 is running. When the inactivity timer 432 expires, the UE 104 may start the short DRX cycle 420 including the on duration 422, which may be different than the active duration 412 of the long DRX cycle, and the off portion 424, which may be different than the off portion 414 of the long DRX cycle 410. Generally, the short DRX cycle 420 is configured to be shorter than the long DRX cycle 410.

The UE 104 may also start a round trip time (RTT) timer 440 for a HARQ process of the transmission. If the transmission is an uplink transmission, the RTT timer 440 may start at the end of the uplink transmission. If the transmission is a downlink transmission, the RTT timer 440 may start at the end of an ACK/NACK for the downlink transmission. The RTT timer 440 may measure an amount of time until the UE 104 is to monitor for a grant for a possible retransmission. The UE 104 may start a retransmission timer 442 (which may be referred to as a ReTX timer) to monitor a window during which a grant for the retransmission may be received. If the UE 104 receives a grant 430 for a retransmission, the UE 104 may start the RTT timer 440 again and monitor for a grant while the retransmission timer 442 is running.

Because a grant for a retransmission does not restart the inactivity timer 432, the RTT timer 440 and/or the retransmission timer 442 may run while the UE 104 is in the short DRX cycle. The UE 104 may monitor for the retransmission grant during the short DRX cycle 420 even if the UE 104 is not in the on duration 422. The base station 102 may transmit a DRX command 434 that immediately starts a DRX cycle. In an aspect, if the UE 104 is configured with a short DRX cycle 420, the DRX command 434 may start the short DRX cycle 420. If the UE 104 is only configured with a long DRX cycle 410, the DRX command 434 may immediately start the long DRX cycle 410 from the DRX command 434. The DRX command 434 may be a long DRX command that may immediately start the long DRX cycle 410 even if the UE 104 is configured with a short DRX cycle.

In some aspects, a UE may operate in a C-DRX mode, such as when the UE monitors a control channel (e.g., PDCCH) for a grant from a base station when the UE is in the awake state of the DRX cycle. When the UE is in the sleep state of the DRX cycle, the UE may power down at least some of the circuitry, components, and/or other elements that the UE uses to receive (e.g., monitor for, detect, and decode) signaling.

A UE may store data for transmission to the base station in one or more transmission buffers. Such data may be temporarily stored in a set of transmission buffers while the UE requests and receives a grant from the base station. The base station may allocate resources for the data buffered at the UE so that the UE is able to reduce or empty data from the set of transmission buffers.

In some aspects, the UE may have the set of transmission buffers at a relatively lower layer, which may also be the layer responsible for building and causing transmission of a transmit request. For example, the UE may hold data at Layer 2 as the UE builds and transmits a request for a grant (although Layer 1 and Layer 3 may include such buffers). Data from higher layers may be prioritized at the lower layers and, in some instances, data having a higher priority than other data may be allocated resources and transmitted sooner than the other data having the lower priority. For example, data may be separated into logical channels according to which dedicated radio bearer (DRB) that data is carried.

Data on a DRB having at least one QoS or QoS Class Identifier (QCI) may be prioritized over other data, such as "normal" data that is not prioritized. This normal data may include data from many applications at the application layer, such as video calling or conferencing applications, gaming applications, streamlining service applications, and other such applications for which a comparatively large amount of data is transmitted and received.

Despite the traffic originating from such applications being considered normal traffic, many of these applications have a low delay budget or are otherwise delay intolerant. For example, the video calling and conferencing applications generally have low delay budgets because video and audio data for such applications becomes stale very quickly. Furthermore, many delay-intolerant applications provide bursty data, e.g., in that data from such applications often arrives unpredictably and in large quantities.

Therefore, consistent and satisfactory operation of the UE may be dependent upon obtaining grants for data in the set of transmission buffers at a sufficient rate to prevent data from becoming stale, as well as prevent too much data from pending at any one time. In some instances, however, the UE may experience some unexpected difficulties or delays in obtaining one or more grants.

In some instances, for example, base stations have abruptly stopped transmitting grants to the UEs for some duration. In some other instances, a UE may be in an environment in which the channel has a low SNR, low RSRP, or is otherwise poor quality. When a UE attempts to communicate on a channel having a significant amount of noise or interference, the UE may fail to correctly decode or may entirely miss a transmission grant from a base station.

When a transmission grant is absent (e.g., the grant is missed or incorrectly decoded), a UE may retransmit another request for a grant. However, the UE may be configured to do so after expiration of a timer, which may have a duration that introduces an appreciable amount of latency to data transmission by the UE. For example, transmitting a request to a base station and receiving a grant in response may be completed on a scale of tens of milliseconds. Conversely, the minimum duration that must be waited before retransmitting the request may on the scale of hundreds of milliseconds.

When a UE is configured to operate in C-DRX, the latency added- to data transmission may be exacerbated. A UE in C-DRX may transition to a sleep state even when the transmission buffers of the UE are nonempty. However, the sleep state in C-DRX may be on the order of hundreds of milliseconds. Consequently, data in the transmission buffers at the UE when the UE transitions to the sleep state in C-DRX may be delayed by hundreds of milliseconds. A delay of such a duration may cause packet discards (e.g., according to a packet discard timer, such as a PDCP layer packet discard timer) and/or dropped or missed packets, which may result in jittery traffic, such as with video call and conferencing applications and other streaming applications.

Some aspects related to a UE obtaining a transmission grant are described herein. Some aspects described herein may reduce latency and/or overhead, as well as reducing dropped, missed, or discarded packets, when a UE is obtaining a transmission grant.

Figure 5:
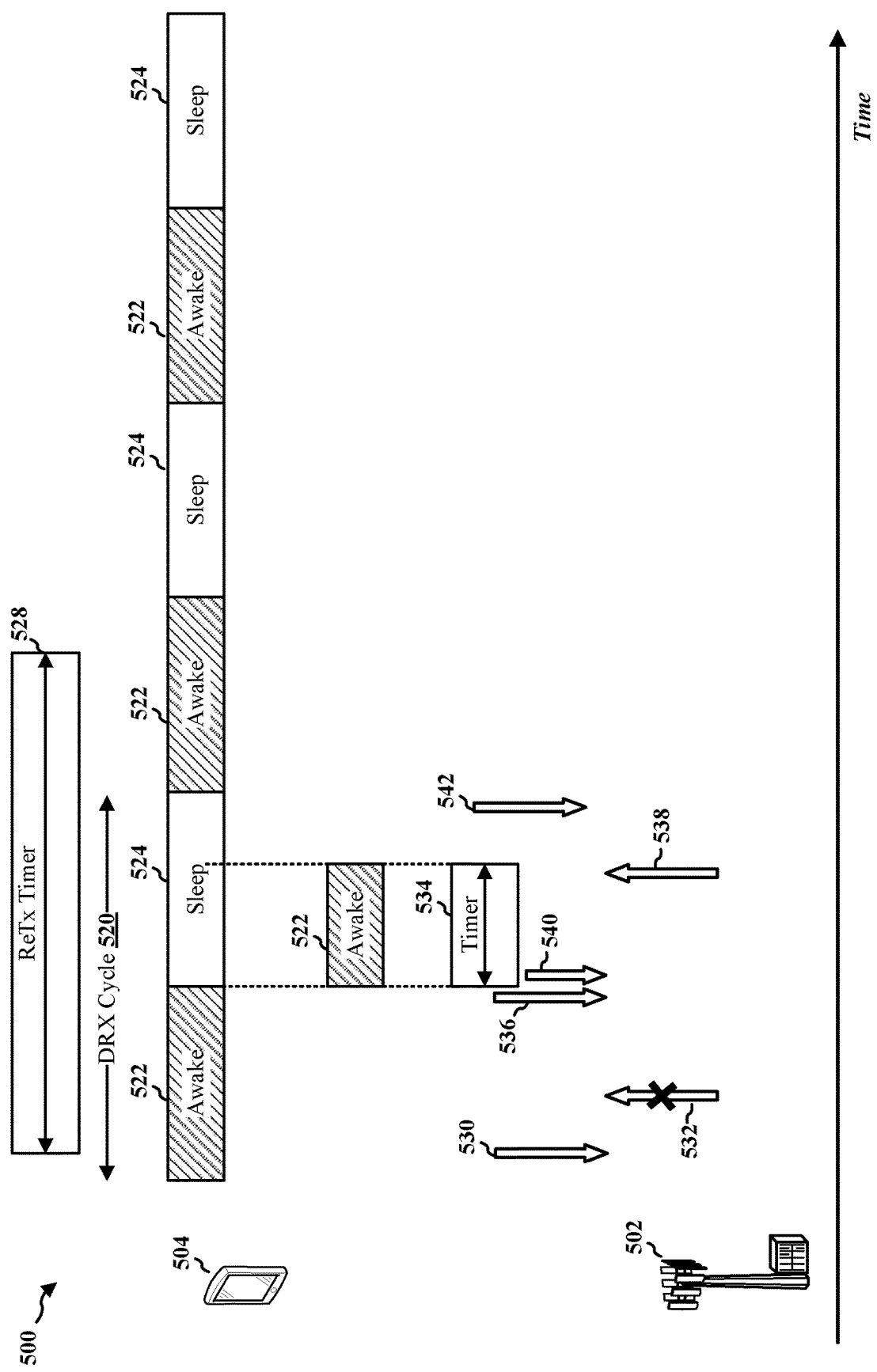
FIG. 5 is a diagram illustrating an example of a UE that may reduce the latency experienced in obtaining a grant from a base station.

FIG. 5 is a diagram 500 illustrating an example of a UE 504 that may reduce the latency experienced by the UE 504 in obtaining a grant from a base station 502. The UE 504 may operate in a DRX mode, including C-DRX (e.g., when the UE 504 is in an RRC Connected state). Thus, the UE 504 may be configured by the base station 502 with a DRX cycle 520, and the UE 504 may alternate between an awake state 522 and a sleep state 524 according to the configured DRX cycle 520. However, the duration that the UE 504 is in a DRX awake state 522 or in a DRX sleep state 524 may be influenced by one or more events.

When the UE 504 is configured with a DRX cycle 520, the UE 504 may remain in the DRX awake state 522 while at least one timer associated with the UE 504 remaining in the DRX awake state 522 is running and unexpired. For example, the UE 504 may remain in the active state while one or more of the following timers is running and unexpired: (1) a DRX On Duration Timer (e.g., drx-onDurationTimer); (2) a DRX Downlink Retransmission Timer (e.g., drx-RetransmissionTimerDL); (3) a DRX Uplink Retransmission Timer (e.g., drx-RetransmissionTimerUL); (4) or a Random Access Contention Resolution Timer (e.g., ra-ContentionResolutionTimer).

In some aspects, the UE 504 may be further configured to remain in the DRX awake state 522 in some other instances. For example, the UE 504 may be configured to remain in the DRX awake state 522 for a time period or until a grant is received after the UE 504 transmits an SR in response to new data arriving at a lower layer of the UE 504 for transmission to the base station 502.

In addition, as described herein, the UE 504 may be configured to remain in a DRX awake state 522 during at least a portion of a scheduled DRX sleep state 524 of a DRX cycle 520 following transmission of a second request to transmit buffered data.

The UE 504 may include a retransmission (ReTx) timer 528 that may define a duration that a UE is to wait before retransmitting a transmission request for a grant (e.g., an uplink grant) to the base station 502. For example, ReTx timer 528 may indicate a duration that a UE should wait before transmitting another uplink grant request to the base station 502 when a UE has not received an uplink grant in response to an earlier request.

The base station 502 may configure the duration of the ReTx timer 528 for the UE 504. The duration of the ReTx timer 528 may be on a scale of hundreds of milliseconds or even seconds—e.g., the duration of the ReTx timer 528 may be configured as low as 320 ms or as high as 10.24 seconds. In some implementations, the base station 502 may configure the ReTx timer 528 for the UE 504 to be one of multiple enumerated values, including a minimum enumerated value.

Examples of the ReTx timer 528 may include a BSR Retransmission (ReTxBSR) timer, an SR Prohibit (sr-Prohibit) timer, an SR periodicity, or another timer specifying a duration that a UE is to wait before requesting a grant. For example, the base station 502 may configure the ReTx timer 528 by transmitting information indicating an SR configuration (e.g., in an sr-ConfigIndex information element) to the UE 504. The SR configuration may be used to calculate an SR periodicity and/or offset, so that one or more additional SRs (e.g., up to a maximum number of SRs according to dsr-TransMax of the SR configuration) can be transmitted based on the SR periodicity when a grant is not obtained after transmitting a first SR.

Thus, with the ReTx timer 528, a UE may instructed by the network (e.g., the base station 502) to wait for at least the duration of the ReTx timer 528 (e.g., 320 ms) before retransmitting a transmission request for a grant. For example, the ReTx timer 528 may have a duration longer than at least one DRX cycle 520, potentially causing data to become stale and be discarded. As described herein, however, the UE 504 may be configured to circumvent the ReTx timer 528 and/or other mechanisms instructing the UE 504 to delay or refrain from transmitting a request for a grant.

As shown in FIG. 5, the UE 504 may transmit the first transmit request 530 for resources on which the UE 504 can transmit data buffered at the UE 504. The first transmit request 530 may be or may include at least one of a BSR or an SR. When the UE 504 transmits the first transmit request 530, the UE 504 may initiate the ReTx timer 528 coinciding with transmitting the first transmit request 530.

The UE 504 may await a grant 532 responsive to the first transmit request 530 after transmission. However, however, the grant 532 may be absent, and so, the UE 504 may determine that the grant 532 is absent. In some examples, the base station 502 may not transmit the grant 532 or the UE 504 may miss the grant 532, and the UE 504 may determine that the grant 532 is absent based on failure of the UE 504 to detect the grant 532 on a channel expected to carry the grant 532. Illustratively, the UE 504 may determine that the grant 532 is absent when the UE 504 has not received the grant 532 at expiration of a timer, such as a timer that is initiated coinciding with transmission of the first transmit request 530. In some other examples, the UE 504 may determine that the grant 532 is absent based on failure of the UE 504 to successfully decode the grant 532, such as when an error rate associated with the grant 532 (e.g., a block error rate) satisfies (e.g., meets or exceeds) a threshold established for error rate.

In still other examples, the UE 504 may determine that the grant 532 is absent based on the quality of the wireless channel on which the UE 504 communicates with the base station 502 failing to satisfy a criterion. Illustratively, the UE 504 may monitor the quality of the wireless channel, such as by measuring an RSRP or SNR, and the UE 504 may compare a value corresponding to the quality of wireless channel to a channel quality threshold. If the UE 504 determines that the value satisfies (e.g., meets or exceeds) the channel quality threshold, then the UE 504 may determine that the quality of the wireless channel is sufficient to receive a grant, and so the grant 532 may be absent for another reason. However, if the UE 504 determines that the value fails to satisfy (e.g., falls below) the channel quality threshold, then the UE 504 may determine that the quality of the wireless channel is too low to receive a grant or may determine that the probability of successfully receiving a grant on the wireless channel is too low. Accordingly, the UE 504 may determine that the grant 532 is absent because the wireless channel quality is insufficient to receive the grant 532.

The UE 504 may further transmit a second transmit request 536 after the first transmit request 530. The second transmit request 536 may be or may include at least one of a BSR or an SR indicating an amount of data in one or more transmission buffers at the UE 504. Potentially, the second transmit request 536 may be different from the first transmit request 530. For example, the first transmit request 530 may be a BSR, whereas the second transmit request 536 may be an SR.

In some aspects, however, the UE 504 may transmit the second transmit request 536 even though the base station 502 had instructed or configured the UE 504 to wait a certain duration before transmitting another request. For example, the UE 504 may transmit the second transmit request 536 before expiration of the ReTx timer 528 (e.g., ReTxBSR timer, sr-Prohibit timer, etc.).

The UE 504 may transmit the second transmit request 536 in absence of the grant 532 responsive to the first transmit request 530. In some aspects, the UE 504 may transmit the second transmit request 536 based on the data that triggered the first transmit request 530 remaining pending (and in at least one transmission buffer(s)) for transmission by the UE 504, and potentially, when no additional data has arrived and/or been placed in the transmission buffer(s) (e.g., when all pending data at a layer of the UE 504 has already been reported to the base station 502 in a transmit request). In some other aspects, the UE 504 may transmit the second transmit request 536 based on the UE 504 being scheduled to enter the DRX sleep state 524. For example, the UE 504 may be at or within a threshold amount of time before the scheduled DRX sleep state 524, and so the UE 504 may transmit the second transmit request 536. In still further aspects, the UE 504 may transmit the second transmit request 536 based on at least two of or all of (1) the buffered data that triggered the first transmit request 530 remaining pending for transmission by the UE 504, (2) the UE 504 being scheduled to enter the DRX sleep state 524, and/or (3) the UE 504 determining that the grant 532 is absent.

The UE 504 may remain in the awake state 522 following transmission of the second transmit request 536 for at least some time period, as the UE 504 may be expecting a grant responsive to the second transmit request 536. If scheduled to be in a DRX sleep state 524 during at least some of the time period, the UE 504 may remain in an awake state 522 for at least a portion of the scheduled DRX sleep state 524 following the transmission of the second transmit request 536.

The base station 502 may receive the second transmit request 536, and based thereon, the base station 502 may allocate resources according to the amount and/or priority of data the UE 504 is requesting to transmit (and potentially, according to the availability of resources). The base station 502 may respond to the second transmit request 536 with a grant 538 indicating the allocation of resources for the amount and/or priority of data indicated by the second transmit request 536.

The UE 504 may monitor a channel with the base station 502 for a grant while the UE 504 remains in the awake state 522 following transmission of the second transmit request 536, such as by monitoring a set of resources of a channel on which a grant is expected to be carried. In some aspects, the UE 504 may receive the grant 538 based on the monitoring of the channel. Accordingly, the UE 504 may assign the data pending in the transmission buffer(s) to allocated resources, and the UE 504 may transmit the data 542 according to the grant 538. Potentially, the UE 504 may transmit the data 542 when in the DRX sleep state 524, e.g., as the DRX sleep state 524 may not affect transmission by the UE 504.

In some aspects, the UE 504 may remain in the awake state 522 for the entire scheduled DRX sleep state 524. For example, the second transmit request 536 may be considered by the UE 504 to be pending until a grant is received—e.g., the UE 504 could potentially receive a grant after all or most of a full DRX cycle 520. In one configuration, the UE 504 may transmit, to the base station 502, a message 540 indicating that the UE 504 is remaining awake for the entire scheduled DRX sleep state 524. The UE 504 may transmit the message 540 to the base station 502 at any time—e.g., the UE 504 may transmit the message 540 to the base station 502 before transmitting the second transmit request 536, the UE 504 may transmit the message 540 to the base station 502 after transmitting the second transmit request 536, or the UE 504 may include information indicating the message 540 in the second transmit request 536 to the base station 502.

The base station 502 may receive the message 540 indicating that the UE 504 is remaining awake for the entire scheduled DRX sleep state 524. The base station 502 may store information that indicates when the UE 504 is scheduled to be in the DRX sleep state 524 (e.g., the base station 502 may configure scheduling of the awake state 522 and the sleep state 524 for the DRX cycle 520 of the UE 504), and therefore, the base station 502 may refrain from transmitting to the UE 504 when the UE 504 is in the DRX sleep state 524. However, the message 540 may inform the base station 502 that the UE 504 will be able to receive downlink transmissions for a longer duration while the UE 504 remains awake. Accordingly, where the base station 502 may have otherwise delayed or refrained from transmitting the grant 538 to the UE 504 because the UE 504 was scheduled to be in the DRX sleep state 524, the base station 502 may instead transmit the grant 538 to the UE 504 after receiving the message 540 indicating the UE 504 is remaining awake for the scheduled DRX sleep state 524.

Potentially, however, the UE 504 may fail to successfully receive the grant 538. For example, the UE 504 may determine that the grant 538 is absent, such as by determining that the UE 504 failed to decode the grant 538 or determining that the UE 504 missed the grant 538. In some aspects, the UE 504 may transmit another transmit request (e.g., similar to the second transmit request 536) to the base station 502, causing the UE 504 to remain awake if the UE 504 were scheduled to be in the DRX sleep state 524.

The UE 504 may repeatedly transmit one or more other transmit requests after the second transmit request 536, and the other transmit requests may be similar to the second transmit request 536. In some aspects, the UE 504 may maintain a count of the number of transmit requests, which the UE 504 may increment by one for each transmit request following the first transmit request 530 that is triggered by data being placed in the transmission buffer(s) for transmission to the base station 502. The UE 504 may repeatedly transmit one or more other transmit requests after the second transmit request 536 until the UE 504 determines that the number of transmit requests satisfies (e.g., meets or exceeds) a transmit request threshold. When the UE 504 determines that the number of transmit requests satisfies the transmit request threshold, the UE 504 may refrain from transmitting additional requests until new data is placed in the transmission buffer(s).

In some aspects, the UE 504 may initiate a request period timer 534 coinciding with transmission of the second transmit request 536, e.g., when the transmit request threshold is one and so is satisfied by transmission of the second transmit request 536 (otherwise, the UE 504 may initiate the request period timer 534 coinciding with transmission of the last request causing the transmit request threshold to be satisfied). The request period timer 534 may define a duration over which the UE 504 may remain awake while monitoring for a grant and/or a duration over which the UE 504 may transmit one or more transmit requests for pending data that has already been reported to the base station 502 (e.g., without any further data being placed in the transmission buffer(s)). If the UE 504 is not remaining awake for an entire scheduled DRX sleep state 524 and a DRX sleep state is scheduled to occur (or scheduled to be ongoing), the UE 504 may enter a scheduled DRX sleep state 524 upon expiration of the request period timer 534, e.g., regardless of whether a grant has been received.

In some aspects, the request period timer 534 may be configured with a duration that is less than the duration of the DRX sleep state 524 configured for the UE 504. In some aspects, the request period timer 534 may be configured with a duration that is less than that of the ReTx timer 528. For example, the request period timer 534 may have a duration that is on the scale of tens of milliseconds. By way of illustration and not limitation, the request period timer 534 may have a duration of fifty (50) ms.

In some aspects, the request period timer 534 may be autonomously configurable within the UE 504, e.g., such that the UE 504 is able to configure the duration of the request period timer 534 without intervention by the base station 502 or other external system. However, the request period timer 534 may be constrained by a floor (e.g., minimum) duration and/or a ceiling (e.g., maximum) duration. For example, a ceiling duration with which the request period timer 534 may be constrained may prevent the UE 504 from remaining in the awake state 522 for extended durations, as doing so may be expensive in terms of battery consumption, processor consumption, and/or over-the-air resources. In some other aspects, the base station 502 may configure the duration of the request period timer 534 for the UE 504. In still other aspects, the duration of the request period timer 534 may be preconfigured in the UE 504, such as where the duration of the request period timer 534 is defined by a standard for a RAT.

Figure 6:
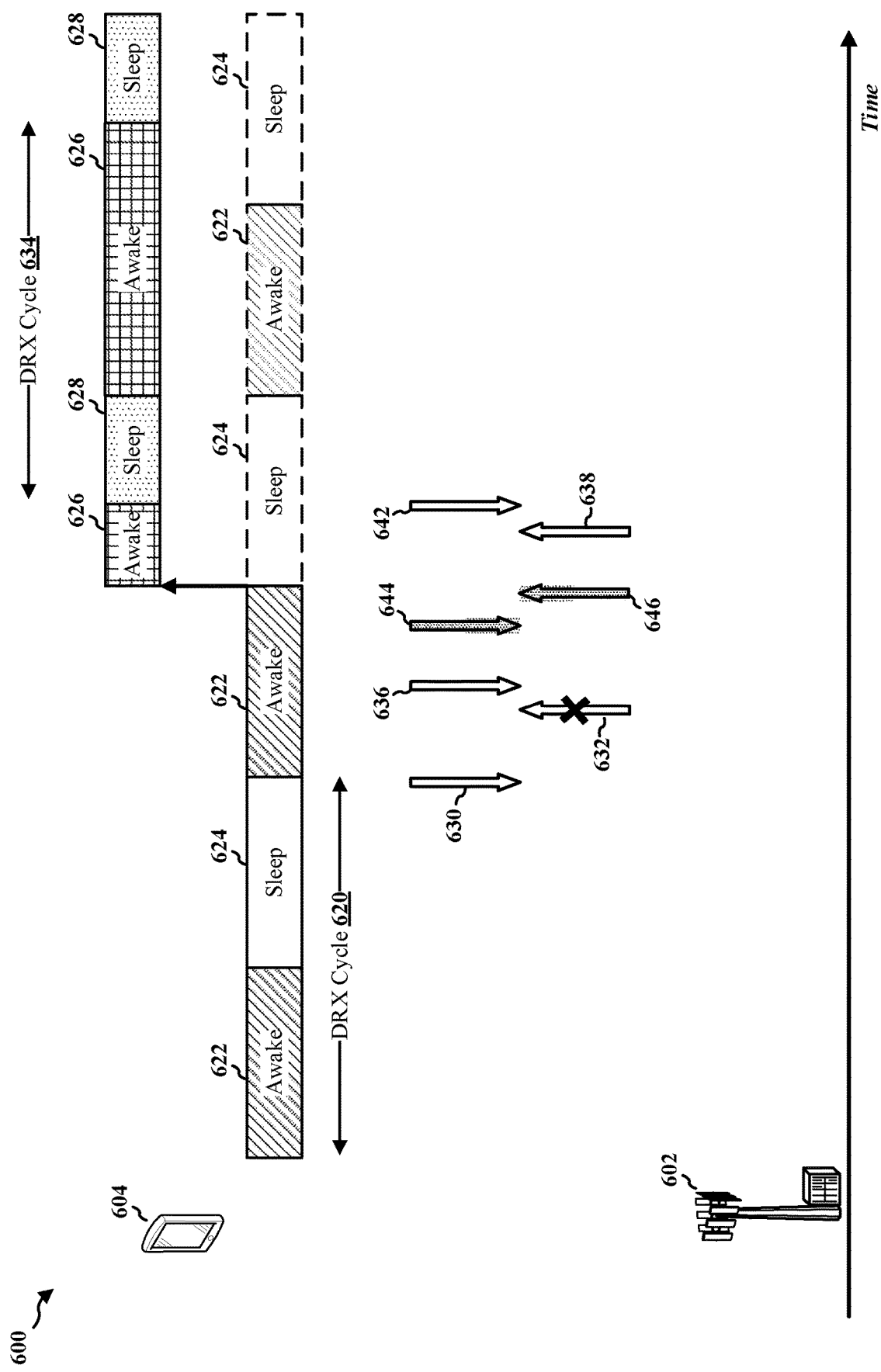
FIG. 6 is a diagram illustrating another example of another UE that may reduce the latency experienced in obtaining a grant from a base station.

FIG. 6 is a diagram 600 illustrating another example of another UE that remains awake during at least a portion of a scheduled DRX sleep state in absence of a grant responsive to a transmit request. A UE configured to operate in DRX (including C-DRX) may contribute to the latency experienced due to absence of a grant, such as when the scheduled DRX sleep state 624 is of a duration that is undesirable for some delay-intolerant traffic the UE 604 may be transmitting. As shown in FIG. 6, however, the UE 604 may be configured to remain awake for at least a portion of a scheduled DRX sleep state 624.

The base station 602 may configure the DRX cycle 620 for the UE 604, and therefore, the UE 604 may be scheduled to enter a DRX sleep state 624 or scheduled to enter a DRX awake state 622, according to the scheduled DRX cycle 620. Potentially, the duration of the DRX sleep state 624 may be of a duration that adds enough latency to data transmission of the UE 604 that performance of some applications may be adversely affected, such as by jitter in video calling and conferencing applications and other similar applications having low delay budgets.

When the UE 604 has data to be transmitted to the base station 602, the UE 604 may transmit a first transmit request 630 for a grant to transmit to the base station 602. For example, the UE 604 may transmit a first transmit request 630 for a grant to transmit to the base station 602 in response to data arriving at a lower layer of the UE 604 (e.g., L1, L2, etc.) and/or data being stored in at least one transmission buffer of the UE 604.

A grant 632 responsive to the request 630, however, may be absent as detected by the UE 604. In some aspects, the UE 604 may determine that the grant 632 is absent based on failure to successfully decode the grant 632. In some other aspects, the UE 604 may be in an environment in which a communication channel includes an appreciable amount of noise or other interference, as detected by the UE 604 from monitoring the quality of the wireless channel, and the UE 604 may determine the absence of the grant 632 based on the quality of the channel not meeting a criterion. For example, the criterion may be a threshold that the UE determines is not met by an SNR, RSRP, etc. measured by the UE 604 on the wireless channel. In some aspects, the UE 604 may determine that the grant 632 is absent upon expiration of the timer and the grant 632 is not received.

The UE 604 may further transmit a second transmit request 636 after the first transmit request 630. The second transmit request 636 may be or may include at least one of a BSR or an SR indicating an amount of data in one or more transmission buffers at the UE 604. Potentially, the second transmit request 636 may be different from the first transmit request 630. For example, the first transmit request 630 may be a BSR, whereas the second transmit request 636 may be an SR.

The UE 604 may transmit a second transmit request 636 in absence of the grant 632 responsive to the first transmit request 630, which potentially violates an instruction or configuration from the base station 602 for the UE 604 to wait a certain duration before transmitting another request. In some aspects, the UE 604 may transmit the second transmit request 636 based on at least one, two, or all of (1) data that triggered the first transmit request 630 remaining pending for transmission by the UE 604 (and in some aspects, no further data arriving that could trigger another transmit request), (2) the UE 604 being scheduled to enter the DRX sleep state 624, and/or (3) the UE 604 determining that the grant 632 is absent.

While the UE 604 may remain awake following transmission of the second transmit request 636 for at least some time period, the UE 604 may be scheduled to enter the DRX sleep state 624 while the second transmit request 636 is pending. For example, the UE 604 may be scheduled to be in the DRX sleep state 624 before a ReTx timer has expired, such as before an sr-Prohibit timer of a ReTxBSR timer has expired. However, the UE 604 may be configured to remain in a DRX awake state during at least a portion of a scheduled DRX sleep state 624 of a DRX cycle 620 by shortening a duration of the DRX sleep state. In so doing, a duration of the DRX awake cycle may be increased.

In order to remain awake during at least a portion of the scheduled DRX sleep state 624, the UE 604 may transmit a message 644 to the base station 602 requesting to shorten the scheduled DRX sleep state 624. For example, the UE 604 may transmit the message 644 in the absence of the grant 632. In some instances, the message 644 may indicate a requested shortened duration of a DRX sleep state and/or a requested extended duration of a DRX awake state. The message 644 may include UE assistance information message.

Correspondingly, the base station 602 may receive the message 644 from the UE 604 requesting to shorten the scheduled DRX sleep state 624. The base station 602 may reconfigure the DRX cycle for the UE 604, such as by configuring a shorter duration of a DRX sleep state 628 and/or a longer duration of a DRX awake state 626 for an adjusted DRX cycle 634. The base station 602 may transmit a response 646 indicating the adjusted DRX cycle 634 to the UE 604. For example, the response 646 may be transmitted via RRC signaling or a MAC control element (CE).

The UE 604 may receive the response 646 from the base station 602, and based thereon, the UE 604 may be reconfigured with the adjusted DRX cycle 634 having the shortened DRX sleep state 628 and the extended DRX awake state 626. Thus, the UE 604 may remain awake during at least a portion of the previously scheduled DRX sleep state 624 by shortening the duration that the UE 604 is scheduled to be in a DRX sleep state. Illustratively, in the adjusted DRX cycle 634, the UE 604 may be in the DRX awake state 626 for at least a portion of the previously scheduled DRX sleep state 624.

In some aspects, the UE 604 may shorten a duration of the DRX sleep state 624 following transmission of the second transmit request 636. For example, the UE 604 may transmit the message 644 following transmission of the second transmit request 636 and/or the UE 604 may receive the response 646 following transmission of the second transmit request 636. In some other aspects, the UE 604 may shorten a duration of the DRX sleep state 624 before transmission of the second transmit request 636. For example, the UE 604 may transmit the message 644 before transmission of the second transmit request 636 and/or the UE 604 may receive the response 646 before transmission of the second transmit request 636. In still further aspects, the UE 604 may shorten a duration of the DRX sleep state using the second transmit request 636 (e.g., the second transmit request 636 may include the message 644).

The base station 602 may receive the second transmit request 636, and based thereon, the base station 602 may allocate resources according to the amount and/or priority of data the UE 604 is requesting to transmit (and potentially, according to the availability of resources). The base station 602 may respond to the second transmit request 636 with a grant 638 indicating the allocation of resources for the amount and/or priority of data indicated by the second transmit request 636.

As the DRX awake state 626 is of a longer duration in the adjusted DRX cycle 634 than the previous DRX awake state 622 of the previous DRX cycle 620, the UE 604 may be able to receive the grant 638 responsive to the request 636 over a longer duration and/or at a time that the UE 604 previously would have been scheduled in the DRX sleep state 624. As the base station 602 configures scheduling of the awake states 622, 626 and sleep states 624, 628 of the DRX cycles 620, 634 for the UE 604, the base station 602 may store information that indicates when the UE 604 is scheduled to be in the DRX sleep state 628 of the adjusted DRX cycle 634. Therefore, the base station 602 may transmit the grant 638 to the UE 604 when the UE 604 was earlier scheduled to be in the DRX sleep state 624, according to the earlier DRX cycle 620. Accordingly, where the base station 602 may have otherwise delayed or refrained from transmitting the grant 638 to the UE 604 because the UE 604 was previously scheduled to be in the DRX sleep state 624, the base station 602 may instead transmit the grant 638 to the UE 604 during the DRX awake state 626, according to the valid or current DRX cycle 634.

The UE 604 may monitor a channel with the base station 602 for a grant while the UE 604 remains in the awake state 626 following transmission of the second transmit request 636, such as by monitoring a set of resources of a channel on which a grant is expected to be carried. The UE 604 may receive the grant 638 based on the monitoring of the channel. Accordingly, the UE 604 may assign the data pending in the transmission buffer(s) to allocated resources, and the UE 604 may transmit the data 642 according to the grant 638. Potentially, the UE 604 may transmit the data 642 when in the DRX sleep state 628, e.g., as DRX sleep state may not affect transmission by the UE 604.

Figure 7:
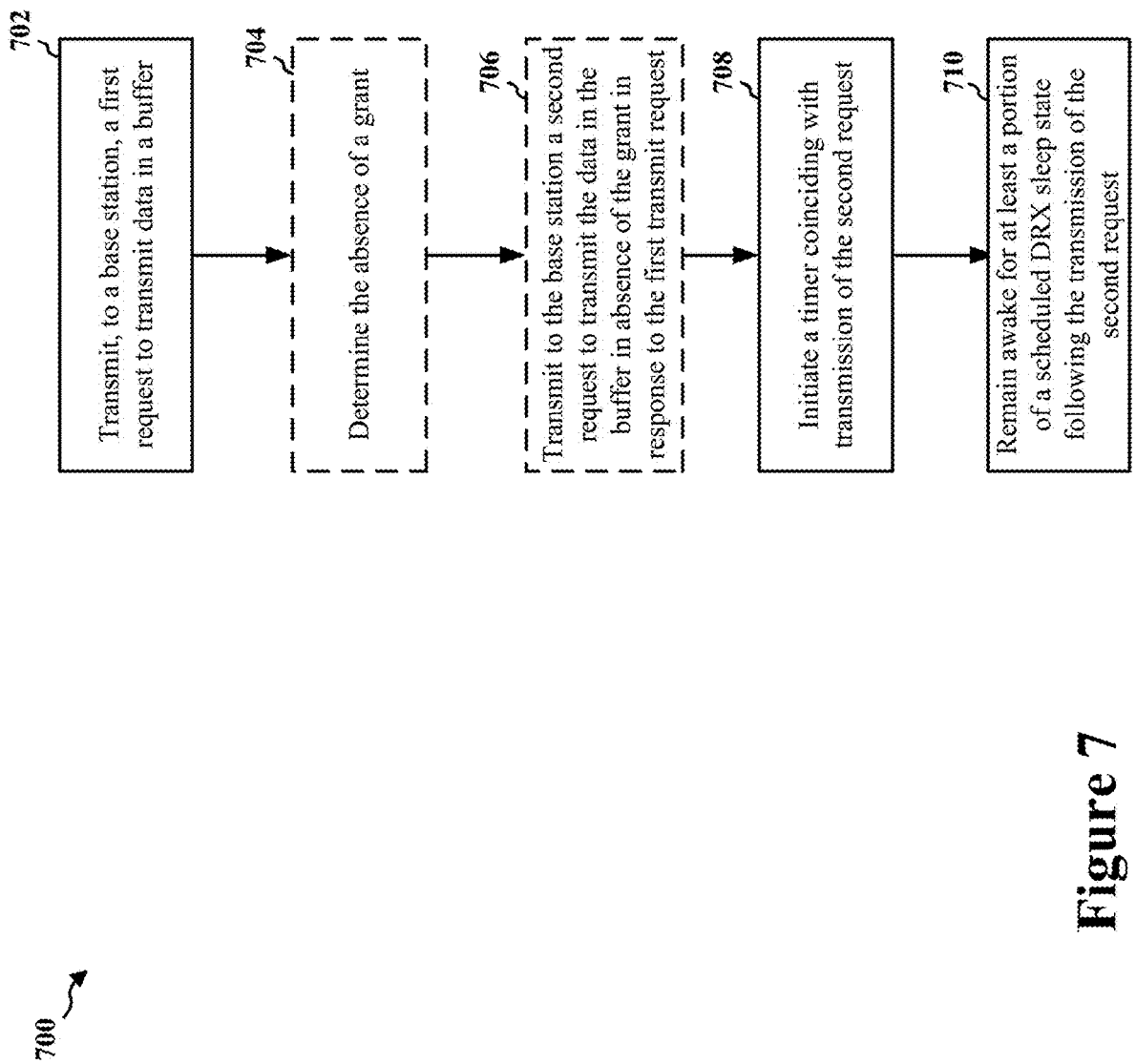
FIG. 7 is a flowchart of a method of wireless communication at a UE.

FIG. 7 is a flowchart of a method 700 of wireless communication. The method may be performed at a UE (e.g., the UE 104, 350, 504, 604) or another apparatus. In some different aspects, one or more illustrated blocks may be omitted, transposed, or contemporaneously performed.

At 702, the UE may transmit, to a base station, a first request to transmit data in a buffer. The request may include an SR and/or a BSR. For example, referring to FIG. 5, the UE 504 may transmit, to the base station 502, the first transmit request 530 to transmit data in a buffer. For example, referring to FIG. 6, the UE 604 may transmit, to the base station 602, the first transmit request 630 to transmit data in a buffer.

At 704, the UE may determine that a grant in response to the request is absent. For example, the UE may determine that the duration of a coincident timer has expired, and the UE may determine that the grant responsive to the request has not been received at the expiration of the timer. In another example, the UE may attempt to decode information on a control channel (e.g., a PDCCH), and the UE may fail to successfully decode the information on the control channel; thus, the UE may determine the absence of the grant based on the failure to successfully decode the grant. In still another example, the UE may monitor a quality of a wireless channel with the base station, and may the UE determine the absence of the grant based on the quality of the wireless channel not meeting a criterion. Illustratively, the criterion may be a threshold, such as a minimum threshold, and the UE may receive reference signals from the base station on the wireless channel. The UE may measure an SNR, RSRP, or other value based on receiving the reference signals. The UE may compare the SNR, RSRP, or other value to the threshold, and if the SNR, RSRP, or other value does not meet the threshold, then the UE may determine that the grant is absent.

For example, referring to FIG. 5, the UE 504 may determine that a grant 532 in response to the first transmit request 530 is absent. For example, referring to FIG. 6, the UE 604 may determine that a grant 632 in response to the request 630 is absent.

At 706, the UE may transmit, to the base station, a second request to transmit the data in the buffer in absence of the grant responsive to the first request. For example, the UE may determine the absence of a grant (704), which may at least partially fulfill the condition(s) upon which transmission of the second request is based. In some aspects, the UE may transmit the second request based on the buffered data being the same or including some of that which triggered the first request. Potentially, no new data may have been added to the buffer after the UE reports the buffered data to the network in the first request and before the UE transmits the second request. The request may include an SR and/or a BSR. For example, referring to FIG. 5, the UE 504 may transmit, to the base station 502, the second transmit request 536 to transmit data in a buffer in absence of the grant 532 responsive to the first transmit request 530. For example, referring to FIG. 6, the UE 604 may transmit, to the base station 602, the second transmit request 636 to transmit data in a buffer in absence of the grant 632 responsive to the first transmit request 630.

At 708, the UE may initiate a timer coinciding with transmission of the request. For example, the UE may determine a timer duration after which the UE is to enter a DRX sleep state (e.g., while a grant request is pending), and/or after which the UE is to cease or temporarily suspend transmitting requests for the data in the buffer (and already reported to the buffer). The UE may begin measuring the timer duration coincident with the transmission of the second request, and the UE may determine whether the duration has elapsed after detecting that the request is transmitted. In some aspects, the duration of the timer may be configurable by the UE. For example, referring to FIG. 5, the UE 504 may initiate the request period timer 534 coincident with transmission of the second transmit request 536 to transmit data in a buffer. For example, referring to FIG. 6, the UE 604 may initiate a timer coincident with transmission of the second transmit request 636 to transmit data in a buffer.

At 710, the UE may remain awake for at least a portion of a scheduled DRX sleep state following the transmission of the second request. In one example, the UE may remain awake for the at least a portion of the scheduled DRX sleep state based on the scheduled DRX sleep state being scheduled to occur before the timer (initiated at 708) expires.

In another example, the UE may determine that at least one transmission buffer is not empty when the UE is scheduled to enter a DRX sleep state, the UE may transmit a request for resources on which to transmit the buffered data, and the UE may refrain from reducing power to some receiver circuitry in order to receive a grant during the scheduled DRX sleep state. The UE may monitor the base station (or monitor a wireless channel) for the grant responsive to the second transmit request for the at least a portion of the scheduled DRX sleep state. For example, the UE may decode information carried on resources of a control channel, the UE may compare some decoded information to an identifier (e.g., RNTI) of the UE, and the UE may determine whether other information on the control channel is intended for the UE based on the comparison. In some aspects, the UE may remain awake for the entire scheduled DRX sleep state following the transmission of the second request. The UE may transmit a message to the base station indicating that the UE is remaining awake for the entire scheduled DRX sleep state.

For example, referring to FIG. 5, the UE 604 may remain in the DRX awake state 522 for at least a portion of a scheduled DRX sleep state 624 following transmission of the second transmit request 536. The UE 604 may remain in the DRX awake state 522 during at least a portion of the time that the second transmit request 536 is pending.

In still another example, the UE may shorten the duration of the DRX sleep state by transmitting a message to the base station requesting to shorten a scheduled DRX sleep state, and the UE may receive a response from the base station indicating a shortened DRX sleep state. In some aspects, the message may include a UE assistance information message, and the response may be received via RRC signaling or a MAC CE.

For example, referring to FIG. 6, the UE 604 may transmit, to the base station 602, a message 644 requesting to shorten the scheduled DRX sleep state 624. The UE 604 may receive, from the base station 602, the response 646 configuring a shortened DRX sleep state 628. Thus, the UE 604 may remain in the DRX awake state 626 for at least a portion of the (previously) scheduled DRX sleep state 624.

Figure 8:
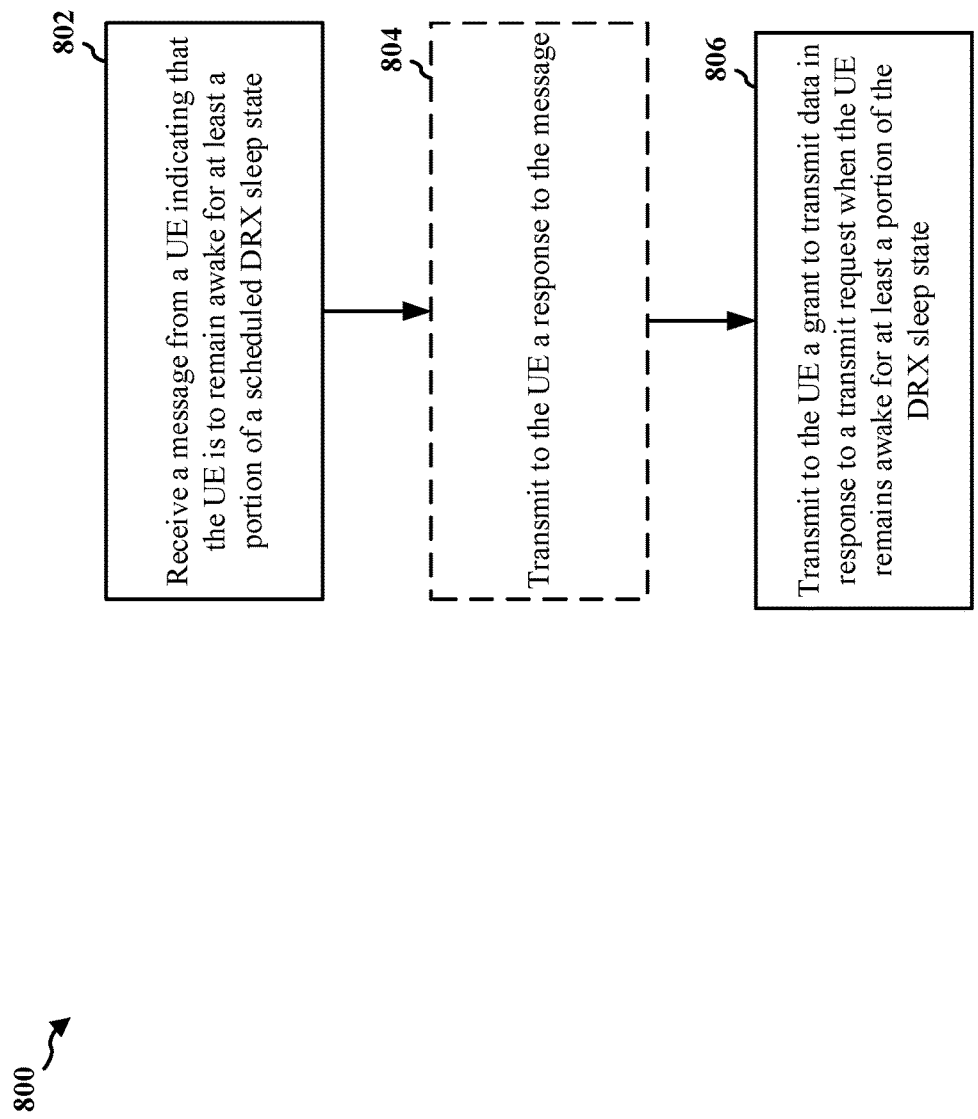
FIG. 8 is a flowchart of a method of wireless communication at a base station.

FIG. 8 is a flowchart 800 of a method of wireless communication. The method may be performed at a base station (e.g., the base station 102/180, 310, 502, 602) and/or apparatus. In some different aspects, one or more illustrated blocks may be omitted, transposed, or contemporaneously performed.

At 802, the base station may receive a message from a UE indicating that the UE is remaining awake for at least a portion of a scheduled DRX sleep state. In some aspects, the message indicating that the UE is remaining awake for at least a portion of a scheduled DRX sleep state includes an indication that the UE is remaining awake for the entire scheduled DRX sleep state. In some other aspects, the indication that the UE is remaining awake for at least a portion of a scheduled DRX sleep state includes a message requesting to shorten the scheduled DRX sleep state. In some aspects; the message may include UE assistance information.

For example, referring to FIG. 5, the base station 502 may receive the message 540 from the UE 504 indicating that the UE 504 is remaining in the DRX awake state 522 for the entire scheduled DRX sleep state 524. For example, referring to FIG. 6, the base station 602 may receive the message 644 requesting to shorten the scheduled DRX sleep state 624 to the shortened DRX sleep state 628.

At 804, the base station may transmit a response to the message to the UE. The response may include information configuring the UE with a shortened DRX sleep state, such as a message that reconfigures the DRX cycle and/or DRX timers of the UE. The message may be transmitted via RRC signaling or MAC CE. For example, referring to FIG. 6, in response to the message 644 from the UE 604 requesting to shorten the scheduled DRX sleep state 624, the base station 602 may transmit the response 646 configuring a shortened DRX sleep state 628. Thus, the UE 604 may remain in the DRX awake state 626 according to the adjusted DRX cycle 634 for at least a portion of the previously scheduled DRX sleep state 624 of the outdated DRX cycle 620.

At 806, the base station may transmit to the UE a grant to transmit data in response to a transmit request when the UE remains awake for at least a portion of the scheduled DRX sleep state. The grant may be transmitted during a scheduled DRX sleep state.

In some aspects, the base station may transmit the grant responsive to the request based on the message indicating that the UE is remaining awake during at least a portion of the scheduled DRX sleep state. For example, referring to FIG. 5, the base station 502 may transmit, to the UE 504, the grant 538 to transmit data responsive to the second transmit request 536 when the UE 504 remains awake during at least a portion of the scheduled DRX sleep state 524. The base station 502 may transmit, to the UE 504, the grant 538 to transmit data responsive to the second transmit request 536 based on the message 540 received from the UE 504 indicating that the UE 504 is remaining awake for the entire scheduled DRX sleep state 524.

In some other aspects, the base station may transmit the grant responsive to the transmit request during a DRX awake state of an adjusted DRX cycle, which may also have a DRX sleep state that is shortened from the (previously) scheduled DRX sleep state. The DRX awake state of the adjusted DRX cycle may overlap with the previously scheduled DRX sleep state of another DRX cycle. For example, referring to FIG. 6, the base station 602 may transmit to the UE 604 the grant 638 to transmit data in response to the second transmit request 636 while the UE 604 remains in the extended DRX awake state 626 during at least a portion of the previously scheduled DRX sleep state 624.

Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example 1 may be an apparatus for wireless communication at a UE, comprising: a processor; a memory coupled with the processor; and instructions stored in the memory and operable, when executed by the processor, to cause the apparatus to: transmit to a base station a first request to transmit data in a buffer; transmit to the base station a second request to transmit the data in the buffer in absence of a grant in response to the first transmit request; and remain awake for at least a portion of a scheduled DRX sleep state following the transmission of the second request.

Example 2 may be the apparatus of Example 1, wherein to remain awake for at least a portion of the scheduled DRX sleep state comprises to remain awake for the entire scheduled DRX sleep state.

Example 3 may be apparatus of any of Examples 1 or 2, wherein the instructions, when executed by the processor, further cause the apparatus to: monitor the base station for a grant during the scheduled DRX sleep state.

Example 4 may be the apparatus of any of Examples 1 to 3, wherein the instructions, when executed by the processor, further cause the apparatus to: initiate a timer coinciding with the transmission of the second request; wherein the UE remains awake for the at least a portion of the scheduled DRX sleep state based on the scheduled DRX sleep state being scheduled before the timer expires.

Example 5 may be the apparatus of Example 4, wherein a duration of the timer is configurable by the UE.

Example 6 may be the apparatus of any of Examples 2 to 5, wherein the instructions, when executed by the processor, further cause the apparatus to: transmit to the base station a message indicating that the UE is remaining awake for the entire scheduled DRX sleep state.

Example 7 may be the apparatus of Example 1, wherein the remaining awake for at least a portion of the scheduled DRX sleep state comprises shortening the scheduled DRX sleep state.

Example 8 may be the apparatus of Example 7, wherein the instructions, when executed by the processor, further cause the apparatus to: transmit to the base station a message requesting to shorten the scheduled DRX sleep state.

Example 9 may be the apparatus of Example 8, wherein the message includes UE assistance information.

Example 10 may be the apparatus of any of Examples 8 to 9, wherein the scheduled DRX sleep state is shortened based on a response received from the base station to the message.

Example 11 may be the apparatus of Example 10, wherein the response is received via RRC signaling or a MAC CE.

Example 12 may be the apparatus of any of Examples 1 to 11, wherein the instructions, when executed by the processor, further cause the apparatus to: determine the absence of the grant based on a failure to successfully decode the grant.

Example 13 may be the apparatus of any of Examples 1 to 11, wherein the instructions, when executed by the processor, further cause the apparatus to: monitor quality of a wireless channel with the base station; and determine the absence of the grant based on the quality of the channel not meeting a criterion.

Example 14 may be apparatus for wireless communication at a base station, comprising: a processor; memory coupled with the processor; and instructions stored in the memory and operable, when executed by the processor, to cause the apparatus to: receive a message from a UE indicating that the UE is remaining awake for at least a portion of a scheduled DRX sleep state; and transmit to the UE a grant to transmit data in response to a transmit request when the UE remains awake for at least a portion of the scheduled DRX sleep state.

Example 15 may be the apparatus of Example 14, wherein the message indicating that the UE is remaining awake for at least a portion of a scheduled DRX sleep state comprises an indication that the UE is remaining awake for the entire scheduled DRX sleep state.

Example 16 may be the apparatus of any of Examples 14 or 15, wherein the grant is transmitted during the scheduled DRX sleep state.

Example 17 may be the apparatus of Example 14, wherein the message indicating that the UE is remaining awake for at least a portion of a scheduled DRX sleep state comprises a request to shorten the scheduled DRX sleep state.

Example 18 may be the apparatus of any of Examples 14 to 17, wherein the message includes UE assistance information.

Example 19 may be the apparatus of any of Examples 17 or 18, wherein the instructions, when executed by the processor, further cause the apparatus to: transmit to the UE a response to the message, wherein the response configures a DRX sleep state that is shorter than the scheduled DRX sleep state.

Example 20 may be the apparatus of Example 19, wherein the response is transmitted to the UE via RRC signaling or a MAC CE.

I. Appendix

UE CDRX mode Enhancements

II. Situation(s) Being Addressed

This is a novel approach to reduce packet latency and packet drop when network (NW) gives no uplink (UL) grant to a User Equipment (UE) or the UE is in low SNR area while it has data pending in UL buffers.

Scenario 1: In NR5G or LTE networks, a UE may not receive grant though a valid buffer status report indicating non-zero buffer index is sent to NW. There were instances observed during field tests, where NW scheduler abruptly stops providing grants to UE.

Scenario 2: In NR5G or LTE networks, a UE may have sent a valid buffer status report indicating non-zero buffer index and may not be able to decode grant from the NW due to fluctuating SNR during mobility in certain geographical areas. There were instances observed during field tests, where UE SNR was fluctuating which could potentially cause UE to miss the PDCCH and thereby, it misses corresponding grant. Issue observed in MAV Radar# 69407185. Please refer to Addendum section for details on Radar analysis.

Only way for UE to recover in above scenarios is to request grants starting a new Scheduling Request (SR) which typically takes tens of milliseconds (if SR is scheduled by normal procedure due to regular BSR triggered by BSR RETX timer expiry, which may take, e.g., 320 ms). This increases latency for packets awaiting transmission in UE's buffers.

This problem is more evident in cases when Connected mode DRX (CDRX) is enabled between UE and NW. In such cases, UE may enter inactive state, which is in order of few hundreds of msecs, though buffers are non-empty. In addition to large packet latency, this may cause packet discards (due to PDCP discard timer). For delay-sensitive applications, this results in jittery traffic at network end and bad end-to-end user experience.

III. Description of Approach(es) to Address the Situation(s)

Discontinuous Reception (DRX)
*When a DRX cycle is configured for a UE, the Active Time of the UE may include the time while:*
- *drx-onDurationTimer or drx-InactivityTimer or drx-RetransmissionTimerDL or drx-RetransmissionTimerUL or ra-ContentionResolutionTimer*

*is running drx-InactivityTimer ENUMERATED*

*{ ms0, ms1, ms2, ms3, ms4, ms5, ms6, ms8, ms10, ms20, ms30, ms40, ms50, ms60, ms80,* *ms100, ms200, ms300, ms500, ms750, ms1280, ms1920, ms2560,* *spare9, spare8, spare7, spare6, spare5, spare4, spare3, spare2, spare1},*

Before entering CDRX (e.g., sleep state), UE may determine one or more of: (1) if data is available for transmission; and/or (2) if SNR is fluctuating; and/or (3) if there is a chance of PDCCH not being decoded at UE. UE can perform one or more of:

```
DRX-Preference-r16 ::=        SEQUENCE {
    preferredDRX-InactivityTimer-r16   ENUMERATED {
                                        ms0, ms1, ms2, ms3, ms4, ms5, ms6, ms8, ms10, ms20,
ms30, ms40, ms50, ms60, ms80,
                                        ms100, ms200, ms300, ms500, ms750, ms1280, ms1920,
ms2560, spare9, spare8,
                                        spare7, spare6, spare5, spare4, spare3, spare2,
spare1} OPTIONAL,
    preferredDRX-LongCycle-r16         ENUMERATED {
                                        ms10, ms20, ms32, ms40, ms60, ms64, ms70, ms80, ms128
ms160, ms256, ms320, ms512,
                                        ms640, ms1024, ms1280, ms2048, ms2560, ms5120,
ms10240, spare12, spare11, spare10,
                                        spare9, spare8, spare7, spare6, spare5, spare4,
spare3, spare2, spare1 } OPTIONAL,
    preferredDRX-ShortCycle-r16        ENUMERATED {
                                        ms2, ms3, ms4, ms5, ms6, ms7, ms8, ms10, ms14, ms16,
ms20, ms30, ms32,
                                        ms35, ms40, ms64, ms80, ms128, ms160, ms256, ms320,
ms512, ms640, spare9,
                                        spare8, spare7, spare6, spare5, spare4, spare3,
spare2, spare1 } OPTIONAL,
    preferredDRX-ShortCycleTimer-r16   INTEGER (1..16)   OPTIONAL
}
```

IV. Addendum

MAV Radar# 69407185

Fluctuating SNR in the UE resulting in no grant at UE side. As a result of which, UE went into long CDRX cycle. This resulted in huge gap between 2 UL grants seen at UE side resulting in high jitter in MAV's facetime application (with very low delay budget). MAV was filtering out stale data due to this behavior at UE. Multiple instances of such behavior seen in the logs. Following are the logs corresponding to one Instance

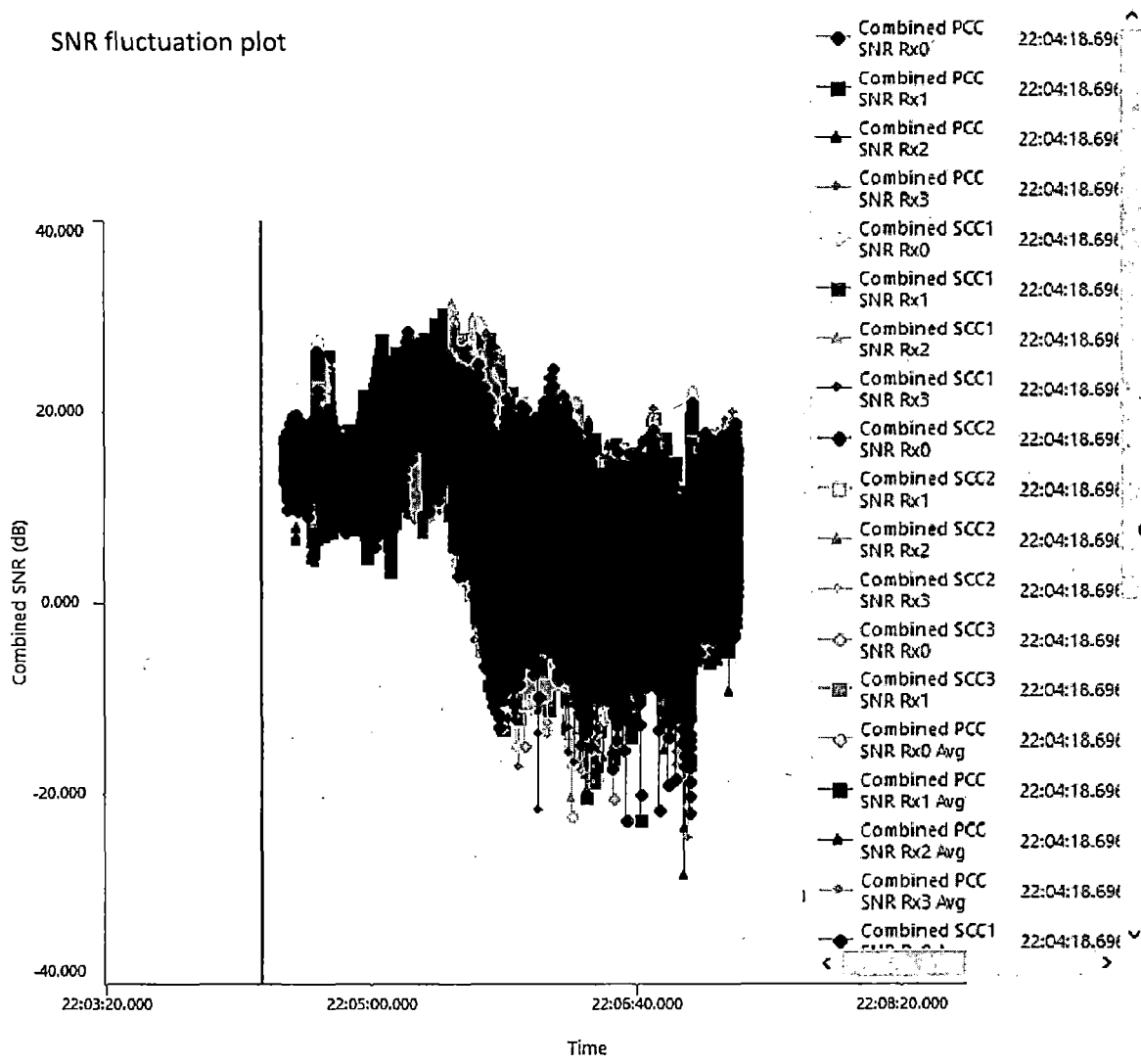

Confidential – Qualcomm Technologies, Inc. and / or its affiliated companies – May Contain Trade Secrets Filtering by MAV due to delay here -> 22.06.12.861-> (294,5)
Removed bytes = 16843

[ 11/ 1/2]     QTRACE     22:06:12.861     LL
2/LowFreq/High/LRLC   [lte_pdcp_ul_protocol.c  17759] Process WM OP=0 stack_id=0 eps_id=5 prio=1 head_lsm=0xf9fab518 tail_lsm=0xf9fac718 total_bytes=16843

Tracing back to the cause of filtering now

---

No grant from (241,2) -> (261,6) and (262,4) -> (293,6) as seen below resulting in filtering at (294,5).

MAC data building up during above time frame: 23722 bytes pending on MAC
2021 Jan 7  22:06:12.862  [FC]  0xB066  LTE MAC UL Buffer Status Internal

```
              |Number|                       |       |       |
         |    |of    |        |New         |New      |       |       |
|Sub|Sub| |active|        |Uncompressed|Compressed|    |Ctrl |Total  |
|Id |FN |SFN |LCIDs |Lc Id|Priority|Bytes     |Bytes     |Retx bytes|bytes|Bytes |

1| 6|
293|  4|  1|   1|    0|    0|     0|    0|    0|
|  |  |  |   | 2|  3|    0|     0|    0|  0|    0|
|  |  |  |   | 3|  4|    0|     0|    0|  0|    0|
|  |  |  |   | 4| 11|    0| 23722|    0|  0| 23722|
```

UE reports correct BSR at available grant occasions: BSR Index = 34 at (240, 4) and BSR Index = 47 at (261,6)

2021 Jan 7  22:06:12.374  [B0]  0xB064  LTE MAC UL Transport Block

```
|Sub|Cell|        |       |      |Grant |RLC |Padding|             |HDR   |             |
|   |    |BSR |BSR |BSR |BSR |      |BSR LCG 0|BSR LCG 1|BSR LCG 2|BSR LCG 3|       |PH
|Pcmax_c|PH  |Pcmax_c|

|Id |Id  |HARQ ID|RNTI Type |Sub-FN|SFN |(bytes)|PDUs |(bytes)|BSR event      |BSR trig
|LEN  |Mac Hdr + CE     |LC ID    |LEN  |LCG 0|LCG 1|LCG 2|LCG 3|PHR Ind|(bytes)
|(bytes) |(bytes) |(bytes)  |Pcmax_c|SCell1|SCell1  |SCell2|SCell2 |
```

---

```
  1|  0|   4|  C-RNTI|    4| 240|  113|   2|    0|High Data Arrival|      S-BSR|    5| 3D 24
03 04 E2    |  S-BSR|   1|   |   |  34|     |     |     |     | 1817|     |    |
|  |

| | |  |   |  |   |  |  |          |    |   |              |  4|  3|
     | | |  |   |  |   |  |  |          |    |   |
```

|   |   |   |   |   |   |   |   |   |   |   |   |   |
|---|---|---|---|---|---|---|---|---|---|---|---|---|
| 4 | -1 |   |   |   |   |   |   |   |   |   |   |   |

2021 Jan 7 22:06:12.574 [EF] 0xB064 LTE MAC UL Transport Block

```
|Sub|Cell|        |    |       |Grant |RLC |Padding|                       |HDR |       |
|   |BSR |BSR |BSR |BSR |       |BSR LCG 0|BSR LCG 1|BSR LCG 2|BSR LCG 3|     |PH
|Pcmax_c|PH  |Pcmax_c|

|Id |Id  |HARQ ID|RNTI Type |Sub-FN|SFN  |(bytes)|PDUs |(bytes)|BSR event   |BSR trig
|LEN  |Mac Hdr + CE     |LC ID    |LEN  |LCG 0|LCG 1|LCG 2|LCG 3|PHR Ind|(bytes)
|(bytes) |(bytes) |(bytes) |Pcmax_c|SCell1|SCell1 |SCell2|SCell2 |
```

---

```
| 1| 0|  0|  C-RNTI|   6| 261| 2124|  2|  0|       Periodic|    S-BSR|  7| 3D 3A 24
03 04 EF 08 |    S-BSR|  1|   |   |   47|   |   |   |   14099|   |   |
|  |
```

|   |   |   |   |   |   |   |   |   |   |   |   |   | PHR |
|---|---|---|---|---|---|---|---|---|---|---|---|---|-----|
| 1 |   |   |   | 8 |   |   |   |   |   |   |   |   |     |

|   |   |   |   |   |   |   |   |   |   |   |   |   | 4 | 3 |
|---|---|---|---|---|---|---|---|---|---|---|---|---|---|---|

|   |   |   |   |   |   |   |   |   |   |   |   |   | 4 | - |
|---|---|---|---|---|---|---|---|---|---|---|---|---|---|---|
| 1 |   |   |   |   |   |   |   |   |   |   |   |   |   |   |

No grant seen by UE here: from (241,2) -> (261,6) and (262,4) -> (293,6)

2021 Jan 7 22:06:12.533 [D5] 0xB172 LTE Uplink PKT Build Indication

```
|   |    |   |   |Transport|         |Power    |     |    |       |         |
|   |Cell|Tx |Tx |Block    |EIB  |   |Headroom|HARQ|Tx  |Corrupt|Commit   |
|
| # |Index|Sfn |Sub-fn|Size  |Address  |RNTI Type |(dB) |ID |Type|CRC  |Time
|Msg Time |
```

---

```
| 17|  0|
241|  2|  113|0x00000000|    C_RNTI|   N/A|  4|ReTx|   No|
11623175|  11572261|
```

| 18| 0| 261| 6| 2124|0x00000001| C_RNTI| -23| 0| New| No| 15539962| 15487169|

2021 Jan 7 22:06:12.871 [CF] 0xB172 LTE Uplink PKT Build Indication

```
|   |    |   |Transport|       |Power   |    |   |       |       |    |
|   |Cell|Tx |Tx       |Block  |EIB     |        |Headroom|HARQ|Tx |Corrupt|Commit |    |
|# |Index|Sfn|Sub-fn|Size     |Address |RNTI Type|(dB)    |ID  |Type|CRC    |Time   |Msg Time |
```

| 0| 0| 262| 4| 2124|0x00000001| C_RNTI| N/A| 0|ReTx| No| 15693558| 15641080|
| 1| 0| 293| 6| 1063|0x00000000| C_RNTI| -23| 0| New| No| 4906723| 4853654|

UE entering long CDRX cycle during above time frame: UE getting into Long CDRX mode aggravates the issue

2021 Jan 7 22:06:12.537 [14] 0xB198 LTE ML1 CDRX Events Info

243| 3| CDRX_ON_2_OFF| NO_EVENTS|

|
261| 2| LONG_CYCLE_START| CYCLE_START|

|
261| 0| CDRX_OFF_2_ON| CYCLE_START|

264| 6| CDRX_ON_2_OFF| NO_EVENTS|

|
293| 2| LONG_CYCLE_START| CYCLE_START|

|
293| 0| CDRX_OFF_2_ON| CYCLE_START

What is claimed is:

1. A method of wireless communication at a user equipment (UE), comprising:
   transmitting to a base station a first request to transmit data in a buffer;
   transmitting to the base station a second request to transmit the data in the buffer in absence of a grant in response to the first transmit request; and
   remaining awake for at least a portion of a scheduled discontinuous reception (DRX) sleep state following the transmission of the second request.

2. The method of claim 1, wherein the remaining awake for at least a portion of the scheduled DRX sleep state comprises remaining awake for the entire scheduled DRX sleep state.

3. The method of claim 2, further comprising:
   monitoring the base station for a grant during the scheduled DRX sleep state.

4. The method of claim 2, further comprising:
   initiating a timer coinciding with the transmission of the second request;
   wherein the UE remains awake for the at least a portion of the scheduled DRX sleep state based on the scheduled DRX sleep state being scheduled before the timer expires.

5. The method of claim 4, wherein a duration of the timer is configurable by the UE.

6. The method of claim 2, further comprising:
   transmitting to the base station a message indicating that the UE is remaining awake for the entire scheduled DRX sleep state.

7. The method of claim 1, wherein the remaining awake for at least a portion of the scheduled DRX sleep state comprises shortening the scheduled DRX sleep state.

8. The method of claim 7, further comprising:
   transmitting to the base station a message requesting to shorten the scheduled DRX sleep state.

9. The method of claim 8, wherein the message includes UE assistance information.

10. The method of claim 8, wherein the scheduled DRX sleep state is shortened based on a response received from the base station to the message.

11. The method of claim 10, wherein the response is received via radio resource control (RRC) signaling or media access control (MAC) control element (CE).

12. The method of claim 1, further comprising:
    determining the absence of the grant based on a failure to successfully decode the grant.

13. The method of claim 1, further comprising:
    monitoring quality of a wireless channel with the base station; and
    determining the absence of the grant based on the quality of the channel not meeting a criterion.

14. An apparatus for wireless communication at a user equipment (UE), comprising:
    a processor;
    memory coupled with the processor; and
    instructions stored in the memory and operable, when executed by the processor, to cause the apparatus to:
    transmit to a base station a first request to transmit data in a buffer;
    transmit to the base station a second request to transmit the data in the buffer in absence of a grant in response to the first transmit request; and
    remain awake for at least a portion of a scheduled discontinuous reception (DRX) sleep state following the transmission of the second request.

15. The apparatus of claim 14, wherein to remain awake for at least a portion of the scheduled DRX sleep state comprises to remain awake for the entire scheduled DRX sleep state.

16. The apparatus of claim 15, wherein the instructions, when executed by the processor, further cause the apparatus to:
    monitor the base station for a grant during the scheduled DRX sleep state.

17. The apparatus of claim 15, wherein the instructions, when executed by the processor, further cause the apparatus to:
    initiate a timer coinciding with the transmission of the second request, wherein the UE remains awake for the at least a portion of the scheduled DRX sleep state based on the scheduled DRX sleep state being scheduled.

18. The apparatus of claim 17, wherein a duration of the timer is configurable by the processor.

19. The apparatus of claim 15, wherein the instructions, when executed by the processor, further cause the apparatus to:
    transmit to the base station a message indicating that the UE is remaining awake during the entire scheduled DRX sleep state.

20. The apparatus of claim 14, wherein to remain awake for at least a portion of the scheduled DRX sleep state comprises to shorten the scheduled DRX sleep state.

21. The apparatus of claim 20, wherein the instructions, when executed by the processor, further cause the apparatus to:
    transmit to the base station a message requesting to shorten the scheduled DRX sleep state.

22. The apparatus of claim 21, wherein the message includes UE assistance information.

23. The apparatus of claim 21, wherein the instructions, when executed by the processor, further cause the apparatus to shorten the DRX sleep state based on a response received from the base station to the message.

24. The apparatus of claim 23, wherein the response is received via radio resource control (RRC) signaling or a media access control (MAC) control element (CE).

25. The apparatus of claim 14, wherein the instructions, when executed by the processor, further cause the apparatus to:
    determine the absence of the grant based on a failure by the processor to successfully decode the grant.

26. The apparatus of claim 14, wherein the instructions, when executed by the processor, further cause the apparatus to:
    monitor quality of a wireless channel with the base station; and
    determine the absence of the grant based on the quality of the channel not meeting a criterion.

* * * * *